United States Patent [19]

Hamaguchi et al.

[11] Patent Number: 5,609,959
[45] Date of Patent: Mar. 11, 1997

[54] CARBON SUBSTRATE AND PRODUCTION THEREOF

[75] Inventors: Maki Hamaguchi; Tetsuya Yamamoto; Tetsuo Suzuki; Hideki Yamamuro; Hiroshi Chosokabe, all of Kobe, Japan

[73] Assignee: Kabushiki Kaisha Kobe Seiko Sho, Kobe, Japan

[21] Appl. No.: 453,887

[22] Filed: May 30, 1995

Related U.S. Application Data

[63] Continuation of Ser. No. 393,363, Feb. 23, 1995, abandoned.

[51] Int. Cl.$^6$ ............................................. C01B 31/02
[52] U.S. Cl. ................. 428/408; 264/29.1; 264/29.6; 264/29.7; 264/319; 428/688
[58] Field of Search ............................ 264/29.1, 29.6, 264/29.7, 319; 428/408, 688

[56] References Cited

U.S. PATENT DOCUMENTS

| | | | |
|---|---|---|---|
| 4,582,632 | 4/1986 | Rokujo | 252/502 |
| 4,698,189 | 10/1987 | Tetzlaff | 264/22 |
| 5,045,298 | 9/1991 | Muramatsu | 423/445 |

*Primary Examiner*—Archene Turner
*Attorney, Agent, or Firm*—Oblon, Spivak, McClelland, Maier & Neustadt, P.C.

[57] ABSTRACT

A carbon substrate is prepared from a molded article of thermosetting resin by heat-treating in an inert atmosphere. The resin is characterized in that the content of Fe, Al, Ni, Co, Cr, and Mg insoluble in the resin is less than 1 ppm each and the content of Ca and Si insoluble in the resin is less than 2 ppm each. The thermosetting resin is further characterized in that the water content is less than 3 wt % and the ratio of the methylene carbon ($CH_2$) connected to the hydroxyl group (OH) is less than 3% (based on the total carbon number). The carbon substrate prepared in this manner is almost free of defects and voids. It is suitable for use as the substrate of magnetic recording medium. The thermosetting resin may be a powdery or granular one which fluidizes and then cures on heating. A molded article of thermosetting resin is prepared by introducing the resin melt into a mold and curing it with heating under pressure. It is subsequently heat-treated in an inert atmosphere to give a molded article of glass-like carbon.

10 Claims, 2 Drawing Sheets

CARBON SUBSTRATE AND PRODUCTION THEREOF

This application is a Continuation of application Ser. No. 08/393,363, filed Feb. 23, 1995 now abandoned.

BACKGROUND OF THE INVENTION

1. Field of the Invention

The present invention relates to a carbon substrate and a process for production thereof, said carbon substrate being suitable for use as a substrate of magnetic disk, recording head, optical lens mold, optical reflector, and photosensitive drum.

2. Description of the Prior Art

Carbon substrates of this kind have been produced by filling a phenolic resin into a mold, forming a molded article of desired shape by hot pressing, and heat-treating the molded article in an inert atmosphere at a high temperature (say, 1200° C.) for carbonization. The carbon substrate produced in this manner has a vitreous structure and hence it is light in weight and superior in surface flatness, surface roughness, and impact resistance to the conventional aluminum, glass, or ceramic substrate for magnetic recording medium. The carbon substrate for magnetic recording medium permits the recording density to be increased more, which in turn makes it possible to reduce the size of magnetic recording medium.

The above-mentioned carbon substrate has defects due to impurities (or ash) originating from the raw material resin. There has been proposed a method of eliminating such defects by limiting the ash content in the raw material resin to 5 ppm or less. (Japanese Patent Laid-open No. 260605/1992). However, it has turned out that the carbon substrate made from a resin containing less than 5 ppm of ash still has such a large number of graphitic defects that it does not have the quality required of magnetic recording medium. In other words, merely reducing the ash content in the raw material resin does not provide the carbon substrate having a minimum of defects, satisfactory for magnetic recording medium.

The carbon substrate may have defects due to voids. Voids occur in the molded article when the resin is cured or the molded article is carbonized. Voids results from gases formed by the thermal decomposition of the resin and also from moisture contained in the resin itself.

There was proposed a method of producing a void-free substrate of glass-like carbon. (Japanese Patent Publication No. 321/1989) The method employs as the raw material a thermosetting resin which has a viscosity of 300–8000 cP (at 25° C.) in its initial condensation state before curing and can contain more than 20 wt % water. The thermosetting resin permits water (formed by curing) and gases (formed by decomposition) to be uniformly dispersed into itself during its curing. This prevents the occurrence of voids.

There was also proposed a method of producing glass-like carbon of compact structure with a minimum of voids. (Japanese Patent Publication No. 55122/1992). This method employs a strong acid (catalyst) as the hardener for the initial condensate of the thermosetting resin as the raw material. This hardener causes the polymerization reaction to proceed slowly and uniformly, thereby making it possible to effectively remove condensation water and decomposition gas.

Moreover, there was proposed a method of preventing the occurrence of voids. (Japanese Patent Publication No. 320210/1989). This method consists of curing the resin and performing postcuring and carbonizing at a controlled: pressure, heating rate, and temperature, such that the rate of water formation is lower than the rate of water diffusion in the resin.

The method disclosed in JP No. 321/1989 has a disadvantage of requiring the troublesome procedure to determine the capacity of the resin to hold water in the initial condensation stage. In addition, it does not clearly indicate the difference between the water holding capacity of the resin in the initial condensation state and the water holding capacity of the resin in the stage of curing and carbonization (in which water is actually formed).

The method disclosed in JP Nos, 321/1989 and 55122/1992 is intended to cause the condensation water and decomposition gas (which occur when the initial condensate as the raw material is cured) to be uniformly dispersed in the matrix resin, thereby preventing the occurrence of voids. Therefore, it has a disadvantage of requiring a long time (say, tens of hours, or even longer than 100 hours) for curing. This leads to a low productivity. It has another disadvantage which results from using an initial condensate as the raw material. That is, the initial condensate gives off a large amount of condensation water and decomposition gas before curing is completed. Their complete elimination is difficult to achieve; some of them (in the form of bubble) remain in the material, giving rise to voids.

The method disclosed in JP No. 320210/1989 has a disadvantage of requiring an extremely troublesome procedure to cure the resin and to perform the postcuring and carbonization. This leads to a high production cost.

In addition, a molded article of conventional glass-like carbon contains a large number of small masses (tens of micrometers in size) which differ in structure and quality from the surrounding. When polished, its surface has pits due to such small masses. Although these pits are only about 100 nm deep, they are not negligible in the application area (such as magnetic disk substrate) where a high degree of flatness and smoothness is necessary for high recording density without errors. Thus there is a demand for a high-performance molded article of glass-like carbon free from such defects.

As mentioned above, the conventional technology was unable to produce a molded article of glass-like carbon having a high degree of surface smoothness. In addition, it needed not only rigid control to cure the initial condensate of the raw material but also a long time for curing. This leads to low productivity and high production cost.

SUMMARY OF THE INVENTION

It is an object of the present invention to provide a carbon substrate and a process for production thereof, said carbon substrate being suitable for use as a substrate for magnetic recording medium because of an extremely small number of defects and voids therein.

It is another object of the present invention to provide a process for producing a carbon substrate which has a uniform surface to be made by polishing into a mirror surface having very good surface smoothness.

It is another object of the present invention provide a process for efficiently producing a carbon substrate which is a molded article of glass-like carbon.

The carbon substrate of the present invention is characterized in that the content of Fe, Al, Ni, Co, Cr, and Mg is less than 1 ppm each and the content of Ca and Si is less than 2 ppm each. These elements are insoluble in the thermosetting resin as the raw material for carbonization.

According to one aspect of the present invention, the carbon substrate is produced by forming a thermosetting resin into a molded article and then carbonizing the molded article, said thermosetting resin containing less than 1 ppm each of Fe, Al, Ni, Co, Cr, and Mg and less than 2 ppm each of Ca and Si, these elements being insoluble in the thermosetting resin.

According to the present invention, the content of impurities insoluble in the raw material resin is limited to a prescribed value. This contributes to the carbon substrate having an extremely small number of defects which is suitable for high-quality magnetic recording medium.

According to claim 7, the thermosetting resin meeting the requirement for low impurity content is one in which the water content is less than 3 wt % and the ratio of methylene carbon connected to the hydroxyl group is less than 3% of the total carbon number.

Limiting the water content in the thermosetting resin and also limiting the ratio of methylene carbon to the total carbon number as defined in claim 7 prevent the occurrence of voids. This leads to the carbon substrate having an extremely small number of defects which is suitable for high-quality magnetic recording medium.

According to claim 9, the process of molding the thermosetting resin consists of heating the thermosetting resin in powder or granular form, thereby fluidizing it, introducing the fluidized thermosetting resin into a mold, and curing it with heating under pressure.

According to claim 10, the molded article of the thermosetting resin is heat-treated or pyrolyzed in an inert atmosphere to give a molded article of glass-like carbon.

The molded article of glass-like carbon produced as mentioned above can be polished to give a carbon substrate having a uniform, smooth mirror surface.

DESCRIPTION OF THE PREFERRED EMBODIMENTS

Figure 1:
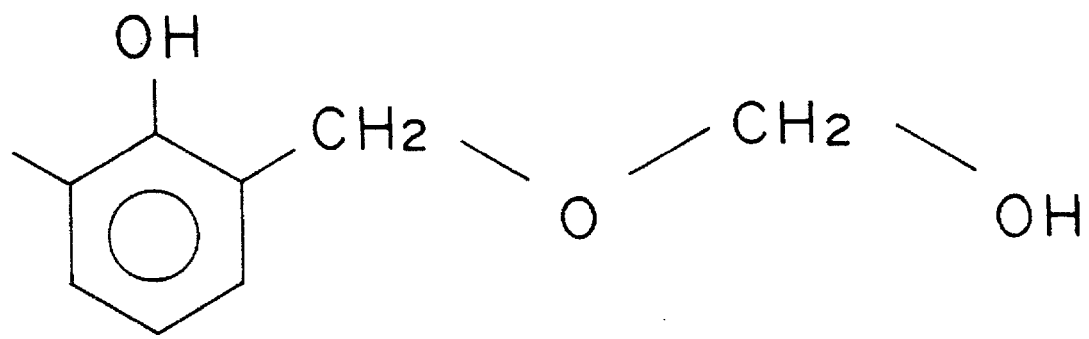
FIG. 1 is a diagram showing the methylene carbon which is connected to the hydroxyl group contained in the hemiformal group.

The present inventors carried out a series of researches on the production of a carbon substrate with a minimum of defects. As the result, it was found that not all ash in the raw material resin causes defects but some impurities insoluble in the raw material resin are deeply involved with defects.

Insoluble impurities in the resin are supposedly present in the form of aggregate. They do not diffuse during molding and heat-treating but function as a catalyst which promotes the change of glass-like carbon into graphite. This results in graphitic defects in the product. On the other hand, impurities soluble in the resin finely disperse in the resin to become salt or ion coordinated with the molecules of the resin. Therefore, their. catalytic activity is not significant and hence they do not cause defects. This is the basic idea that it is possible to produce a carbon substrate having a minimum of defects if the content of insoluble impurities is properly controlled.

The term "graphitic" in this specification means the state in which carbon atoms assume the three-dimensional laminate of hexagonal network structure as the result of change from non-graphitic carbon (ordinary glass-like carbon). Graphitic defects exhibit remarkable optical anisotropy unlike ordinary glass-like carbon.

The present invention requires that the content of Fe, Al, Ni, Co, Cr, and Mg as insoluble impurities in the raw material resin should be less than 1 ppm each. These elements are responsible for graphitic defects when their content exceeds 1 ppm. In addition, the present invention requires that the content of Ca and Si as insoluble impurities in the raw material resin should be less than 2 ppm each. These elements are also responsible for graphitic defects when their content exceeds 2 ppm, although they are not so influential as the elements listed above. It is desirable that the content of insoluble Fe and Al should be less than 0.5 ppm each.

Insoluble impurities in the resin can be removed by dissolving the resin in an organic solvent and then filtering the solution. Alternatively, it is possible to produce the desired resin by polymerization from a solution which has been freed of insoluble impurities by filtration.

In what follows the invention will be described in more detail. The present inventors carried out a series of researches on the relationship between the purity (or ash content) of the raw material and the defects that appear after carbonization. As the result, it was found that the number of defects greatly varies when samples of carbon substrates are prepared from several raw material resins which contain the same amount of ash (less than 5 ppm). It turned out that not all ash in the raw material resin causes defects but some specific impurities insoluble in the resin are responsible for defects. A probable reason for this is that impurities soluble in the resin finely disperse in the resin to become salt or ion coordinated with the molecules of the resin and hence their catalytic activity is not so significant as to graphitize the glass-like carbon. By contrast, insoluble impurities form aggregates which do not disperse during molding and carbonizing. They function as a catalyst to graphitize the glass-like carbon adjacent to them. This is the reason why it is possible to prevent the defects of carbon substrate by controlling the content of insoluble impurities.

According to the present invention, the content of insoluble impurities is determined in the following manner. First, 1 part by weight of the raw material resin is mixed by stirring with 6 parts by weight of methanol-2-butanone mixture (1:1 by weight) at normal temperature under normal pressure for more than 15 minutes. Then, the solution is filtered through filter paper for quantitative analysis. Finally, the filter paper is ashed (according to JIS M8812-1976) and the elements in the ash undergo quantitative analysis.

Al may be determined by ICP-MS (inductively coupled plasma emission spectrometry). Fe and Ca may be determined by atomic absorption spectrometry. Si may be determined by absorption spectrophotometry. The analytical values are shown in terms of ppm based on the weight of the raw material resin. To achieve a sufficient accuracy, with the limit of detection taken into consideration, it is desirable that the amount of the resin sample for analysis should be about 100 g. It is necessary to correct the measured value in accordance with the ash content in the filter paper.

Insoluble impurities in the raw material resin can be removed by dissolving the resin in an organic solvent and filtering the solution. The organic solvent for this purpose may be any of methanol, 2-butanone, and tetrahydrofuran, or a mixture thereof. Alternatively, it is possible to produce the desired resin by polymerization from a solution which has been freed of insoluble impurities by filtration. This filtration may be accomplished while the solution is hot or after the solution has been dissolved in a solvent. The raw material resin obtained by the latter method may be further purified by dissolution and filtration.

It should be pointed out that a silicone defoaming agent used in the production of the phenolic resin contains Si which causes graphitic defects. Therefore, it is desirable not to use any silicone defoaming agent or it is desirable to use a non-silicone defoaming agent (such as mineral defoaming agent). The phenolic resin may contain PVA (polyvinyl alcohol) as a dispersing agent and deteriorated phenolic resin as impurities. They will cause pit-like defects. Deteriorated phenolic resin may be removed by filtration at the same time when insoluble impurities are removed. PVA may be removed by ultrasonically washing the resin with water. Water-washing is recommended if there is a possibility of the resin containing PVA.

The thermosetting resin that can be used in the present invention includes phenolic resin, furan resin, urea resin, and imide resin. Hot pressing, injection molding, and any other known methods can be used to form the thermosetting resin into a desired shape. The molded article of the thermosetting resin can be converted into glass-like carbon as required by heating or pyrolyzing at about 1200° C. in an inert atmosphere according to any known method.

The following Examples and Comparative Examples demonstrate how the process of the present invention is effective in preventing defects in the production of carbon substrate.

COMPARATIVE EXAMPLE A1

Samples of carbon substrates were prepared from a commercial thermosetting resin in the same manner (molding, carbonizing, and polishing) as in Example A1. Table A1 shows the content of impurities in the thermosetting resin and the number of surface defects in the carbon substrate.

EXAMPLE A2

Samples of carbon substrates were prepared from the same thermosetting resin as used in Comparative Example A1 after purification in the following manner. One part by weight of the thermosetting resin was dissolved with stirring in 3 parts by weight each of methanol and 2-butanone, and the solution was filtered through filter paper having a pore diameter of 2 μm to remove insolubles. The resin was recovered from the filtrate by evaporation. The content of impurities in the recovered resin is shown in Table A1. Samples of carbon substrates were prepared from this resin in the same manner as in Example A1. They were tested for surface defects in the same manner as in Example A1. The results are shown in Table A1.

COMPARATIVE EXAMPLE A2

Samples of carbon substrates were prepared in the same manner as in Example A1, except that no purification was performed on phenol and hexamine as the raw materials of the phenolic resin. Table A1 shows the content of impurities in the raw material resin and the number of surface defects in the carbon substrate.

TABLE A1

| | | Content of insoluble elements in resin (ppm) | | | | | | | | Number of defects |
|---|---|---|---|---|---|---|---|---|---|---|
| | | Fe | Al | Ni | Co | Cr | Mg | Si | Ca | per face |
| Example | A1 | 0.1 | 0.2 | 0 | 0 | 0 | 0.9 | 0.1 | 0.2 | 2 |
| | A2 | 0.3 | 0.6 | 0.1 | 0.1 | 0.1 | 1.3 | 0.2 | 1.8 | 8 |
| Comparative | A1 | 1.5 | 10 | 0.5 | 0.2 | 0.7 | 3.5 | 2.8 | 12.5 | 180 |
| Example | A2 | 1.9 | 0.8 | 0.9 | 0.4 | 1.2 | 5.4 | 3.1 | 4.3 | 420 |

EXAMPLE A1

A phenolic resin was prepared from phenol, formalin, and hexamine. The phenol and formalin were purified by hot filtration through filter paper having a pore diameter of 0.5 μm. The hexamine was purified by filtration when it was in the form of aqueous solution. These raw materials were made into a phenolic resin by polymerization in a reactor. Table A1 shows the content of insoluble impurities in the phenolic resin. Incidentally, the filtration and polymerization of the raw materials were carried out in a clean room, Class 1000.

The resulting phenolic resin was hot-pressed to give an annular molded article, measuring 120 mm in outside diameter, 20 mm in inside diameter, and 3 mm thick.

The molded article was heat-treated at about 1200° C. in an inert atmosphere. With the surface and circumference polished, there was obtained a carbon substrate for magnetic recording medium, 95 mm in diameter.

The surface of the carbon substrate was observed using a Normalsky microscope (with a magnification of ×500), and the number of defects larger than 10 μm in each substrate was counted. The results are shown in Table A1.

It is apparent from Table A1 that samples in Examples A1 and A2 have less than 8 defects per face. They are suitable for use as a substrate for magnetic recording medium. By contrast, it is apparent that samples in Comparative Examples A1 and A2 have more than 180 defects per face. They are not suitable for use as a substrate for magnetic recording medium.

The foregoing examples demonstrate the effectiveness of the present invention applied to the carbon substrate for magnetic recording medium. The application of the present invention is not limited to the carbon substrate for magnetic recording medium. It may also be applied to carbon substrate suitable for use as a thin-film magnetic head, a mold for optical lenses, and a substrate for optical reflectors and photosensitive drums.

Claim 7 of the present invention covers the process for producing the carbon substrate, which is explained in the following. The present inventors carried out a series of researches on the prevention of voids in the carbon substrate. At the result, it was found that voids are due mainly to water formed by thermal decomposition of the resin. It was also found that the thermal decomposition reaction to give rise to water is involved with the hydroxyl group connected to the methylene carbon and with the phenolic hydroxyl group. The former reaction takes place at a comparatively low temperature up to 400° C., whereas the latter reaction takes place at a comparatively high temperature in the range of 400°–600° C.

Voids result mainly from water formed by the decomposition of the hydroxyl group (OH) connected to the methylene carbon ($CH_2$). The reason for this is conjectured as follows. The decomposition of the hydroxyl group connected to the methylene group is completed before the temperature reaches about 400° C. At this stage, the resin still remains plastic enough to permit voids to occur by the pressure of water (vapor) formed by the decomposition of the hydroxyl group. By contrast, the decomposition of the phenolic hydroxyl group, which gives rise to water, takes place at 400°–600° C. At this stage, the curing of the resin has been almost completed and there is no chance of water causing voids. In addition, the resin itself is in the porous state which permits steam to easily diffuse out of the molded article of the resin. However, in the case where voids have occurred when the decomposition of the hydroxyl group connected to the methylene carbon is completed, there is the possibility that the voids grow further due to the gases which are formed by the ensuing thermal decomposition.

According to the present invention, the carbon substrate is produced from a thermosetting resin (as a raw material) in which the ratio of the methylene carbon connected to the hydroxyl group is less than 3% (based on the total carbon number). If this requirement is not met, the decomposition of the hydroxyl group forms water more rapidly than its diffusion in the resin, with the result that there will be more water than will be dissolved in the resin and the water (vapor) remaining in the resin causes voids. The ratio of the methylene carbon should preferably be less than 1%.

Another cause of voids is moisture contained in the resin. A large number of voids will occur in the molded article during curing if the raw material resin contains more than 3 wt % water. However, a raw material resin containing less than 1 wt % water would be poor in moldability. Therefore, it is necessary that the water content in the raw material resin should be in the range of 1 to 3 wt %.

Figure 2:
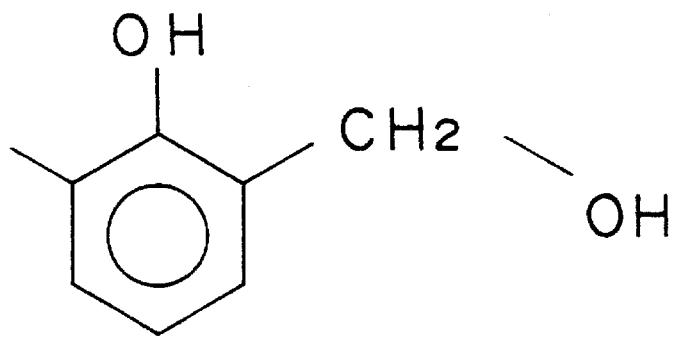
FIG. 2 is a diagram showing the methylene carbon of the methylol group connected to the aromatic ring.

The following examples demonstrate the effect of using a thermosetting resin (as a raw material resin) in which the content of the methylene carbon connected to the hydroxyl group is less than 3% (based on the total carbon number). The content of the methylene carbon is determined by the ordinary $^{13}C$ NMR. The methylene carbon ($CH_2$) connected to the hydroxyl group (OH) in the hemiformal group (shown in FIG. 1) gives a peak at 87–93 ppm, and the methylene carbon of the methylol group connected to the aromatic ring (shown in FIG. 2) gives a peak at 58.8–63 ppm, the reference for both peaks being tetramethylsilane. The ratio (percentage) of the sum of the integrated intensity of the two peaks to the integrated intensity of the entire spectrum is calculated. This value is the content of the methylene carbon connected to the hydroxyl group. (Refer to Phenolic Resin, by Andre Knop, Louis A. Pilato, p. 110, (1980), published by Plastic Age Co., Ltd.)

Incidentally, the raw material resin permits the water formed by curing and pyrolyzing to permeate through it if it contains more than 1 wt % nitrogen. The reason for this is not yet known. Presumably, the diffusion of water is promoted by the functional group containing nitrogen. For this reason, it is desirable that the raw material resin should contain more than 1 wt % nitrogen.

The following description is about the production of the thermosetting resin in which the ratio of the methylene carbon connected to the hydroxyl group is less than 3%. Phenol-formaldehyde resin as a typical raw material of the glass-like carbon substrate is produced by the crosslinking of phenol with formalin. In this process a certain amount of methyl group or hemiformal group (as an intermediate) is inevitably formed. However, when phenol or novolak resin is polymerized by the aid of an amine compound such as hexamethylenetetramine (as a catalyst), a secondary or tertiary amine is formed and it functions as a crosslinking agent for phenol. Thus, polymerization of phenol takes place without forming the methylene carbon connected to the hydroxyl group. In this way it is possible to produce the thermosetting resin in which the content of the methylene group connected to the hydroxyl group is less than 3%. In this case it is desirable to use the amine compound in such a manner that the thermosetting resin contains more than 1 wt % nitrogen.

Alternatively, it is also possible to produce the thermosetting resin in which the content of the methylene group connected to the hydroxyl group is less than 3%, if furfural is used as a crosslinking agent. In this case it is not necessary to reduce the nitrogen content below 1 wt %, because the methylene carbon connected to the hydroxyl group is hardly formed owing to the action of the above-mentioned crosslinking agent.

The thermosetting resin that can be used in the present invention includes phenolic resin, furan resin, urea resin, and imide resin. Hot pressing, injection molding, and any other known methods can be used to form the thermosetting resin into a desired shape. The molded article of the thermosetting resin can be converted into glass-like carbon as required by pyrolyzing at about 1200° C. in an inert atmosphere according to any known method.

The following Examples and Comparative Examples demonstrate the production of carbon substrate by the process covered in claim 7 and how effective the process is in preventing defects.

EXAMPLES B1 AND B2 AND COMPARATIVE EXAMPLES B1 to B3

A phenolic resin was prepared from phenol, formalin, and hexamine by polymerization in a reactor. The amount of the hexamine and the drying condition of the resin were varied so that the resulting four kinds of phenolic resins vary in the ratio of the methylene carbon connected to the hydroxyl group, the water content, and the nitrogen content, as shown in Table B1. Incidentally, the content of the methylene carbon connected to the hydroxyl group was determined by $^{13}C$ NMR.

TABLE B1

|  |  | Ratio of methylene carbon connected to the hydroxyl group (atomic %) | Water content (wt %) | Nitrogen content (wt %) | Number of defects per $cm^2$ |
| --- | --- | --- | --- | --- | --- |
| Example | B1 | 0 | 1.1 | 2.3 | 0 |
|  | B2 | 1.1 | 1.3 | 1.8 | 1 |

TABLE B1-continued

|  |  | Ratio of methylene carbon connected to the hydroxyl group (atomic %) | Water content (wt %) | Nitrogen content (wt %) | Number of defects per cm$^2$ |
|---|---|---|---|---|---|
| Comparative | B1 | 4.6 | 1.3 | 0.2 | >1000 |
| Example | B2 | 1.0 | 3.4 | 1.7 |  |
|  | B3 | 3.8 | 1.5 | 0 | >1000 |

Table B2 below shows the content (in ppm) of insoluble metal impurities in the resin samples used in Examples B1 and B2 and Comparative Examples B1 and B2.

TABLE B2

|  |  | Fe | Al | Ni | Co | Cr | Mg | Si | Ca |
|---|---|---|---|---|---|---|---|---|---|
| Example | B1 | 0.1 | 0.2 | 0.1 | 0.0 | 0.0 | 0.8 | 0.1 | 0.3 |
|  | B2 | 0.1 | 0.3 | 0.0 | 0.0 | 0.1 | 0.6 | 0.2 | 0.3 |
| Comparative | B1 | 0.2 | 0.2 | 0.1 | 0.1 | 0.1 | 0.6 | 0.1 | 0.3 |
| Example | B2 | 0.2 | 0.4 | 0.2 | 0.1 | 0.1 | 0.7 | 0.3 | 0.5 |

The resulting phenolic resin was hot-pressed to give an annular molded article, measuring 120 mm in outside diameter, 20 mm in inside diameter, and 3 mm thick.

The molded article was heat-treated at about 1200° C. in an inert atmosphere. With the surface and circumference polished, there was obtained a carbon substrate for magnetic recording medium, 95 mm in diameter.

The surface of the carbon substrate was observed using a Normalsky microscope (with a magnification of ×100), and the number of defects in the surface per cm$^2$ was counted. The results are shown in Table B1.

In Comparative Example B3, the same procedure as in Example B1 was repeated to give carbon substrates, except that a commercial thermosetting resin was used as the raw material resin. Table B1 shows the ratio of the methylene carbon connected to the hydroxyl group, the water content, and the nitrogen content in the resin used in Comparative Example B3, and the number of surface defects in the carbon substrate.

It is apparent from Table B1 that samples in Examples B1 and B2 have very few defects; whereas samples in Comparative Examples B1 and B3 (with the resin therein containing more (than 3% of the methylene carbon connected to the hydroxyl group) and in Comparative Example B2 (with the resin therein containing more than 3 wt % water) have a large number of defects.

The following description is about the production of the carbon substrate as covered in claim 9 of the present invention. The thermosetting resin as the raw material for the production of the molded article of glass-like carbon should preferably be in the form of liquid from the standpoint of uniform molding. However, a thermosetting resin in liquid form (which has a low molecular weight) takes a long time before complete curing. In addition, it evolves a large amount of condensation water and decomposition gas during curing and its cured product inevitably contains minute bubbles no matter how strict the curing condition might be. By contrast, a thermosetting resin in solid form (which has a sufficiently large molecular weight) cures in a short time and evolves only a small amount of condensation water and decomposition gas during curing. Therefore, its cured product is almost free from minute bubbles. On the other hand, it does not give a molded article of uniform quality because it does not flow sufficiently in the molding process.

The present inventors investigated a raw material resin which meets the above-mentioned mutually contradictory requirements. The investigation led to the finding that it is possible to obtain a molded article of uniform quality from a thermosetting resin in powder or granular form which becomes fluid on heating, by introducing it in the fluid state into a mold and curing it by heating under pressure. This process takes only a short time for molding and curing. The thus obtained molded article can be converted into that of glass-like carbon by heat-treating in an inert atmosphere.

The term "fluidizing" and its related term "flow starting temperature" are explained below. Their measuring apparatus and conditions are as follows.

Apparatus: Flow tester "CFT-500C" made by Shimadzu Corporation
Measuring mode: Temperature-rising mode
Rate of heating: 5° C./min
Sectional area of piston: 1 cm$^2$
Stroke of piston: 20 mm
Nozzle: 1 mm in diameter and 1 mm long
Testing load: 35 kgf
Temperature at which measurement starts: 60° C.
Preheating time: 20 seconds
Amount of sample: 1.8 g
Surrounding gas: atmosphere The procedure for measurement consists of placing a prescribed amount of sample in the preheated barrel (at 60° C.), inserting the piston into the barrel to apply the testing load, raising the temperature up to 160° C. at the prescribed heating rate, and recording the change of the piston stroke which takes place as the resin softens, deforms, fluidizes, and finally flows out of the nozzle. A plot of piston stroke against temperature is called the flow curve.

Figure 3:
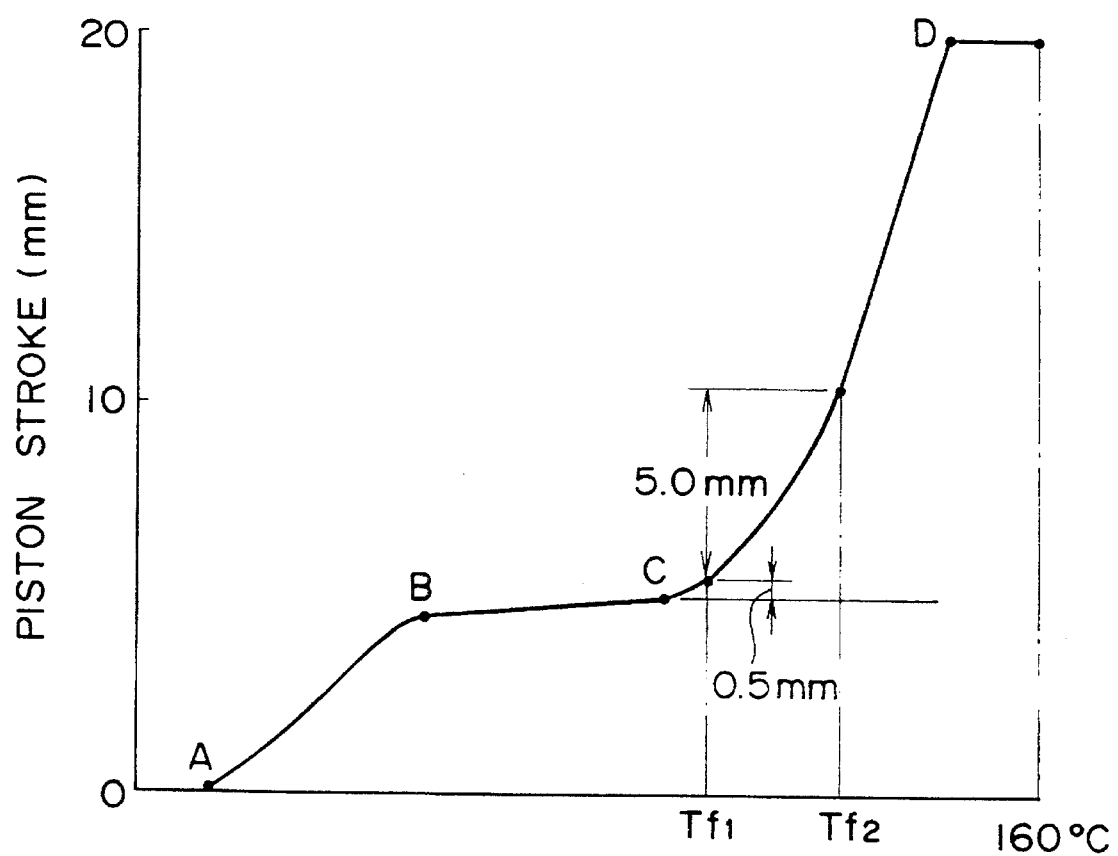
FIG. 3 is a flow curve illustrating "fluidizing" and "flow-starting temperature".

An example of the flow curve is shown in FIG. 3. The path from A to B in the flow curve is referred to as "softening" and the path from C to D, "fluidizing". Any resin that gives a flow curve having the path C–D is called "resin that fluidizes on heating". "Flow starting temperature" (Tf$_1$) is defined as the temperature at which the piston stroke is 0.5 mm which is the distance between the flow curve and the extension line of the straight part B–C of the flow curve.

The flow curve shown in FIG. 3 permits one to distinguish between "softening" and "fluidizing" which are similar phenomena, although thermosetting resins such as phenolic resin, furan resin, and imide-triazine resin undergo "softening", "melting", and "fluidizing" upon heating.

Incidentally, the ease with which the resin fluidizes may be represented by the difference between Tf$_2$ and Tf$_1$. Tf$_1$ is "flow starting temperature" which is defined as the temperature at which the piston stroke is 0.5 mm which is the distance between the flow curve and the extension line of the straight part B–C of the flow curve. Tf$_2$ is the temperature at which the piston advances further by 5.0 mm.

The thermosetting resin used in the present invention should be "a resin which fluidizes on heating". In addition, it should preferably be one which has the value of $(Tf_2-Tf_1)$ smaller than 10° C., which represents the ease with which the resin fluidizes. The thermosetting resin that can be used in the present invention is not specifically limited so long as it "fluidizes" as mentioned above. It includes, for example, phenolic resin, furan resin, imide-triazine resin, furfuryl alcohol resin, epoxy resin, and melamine resin.

For the thermosetting resin to be cured in a short time without evolution of bubbles, it is necessary that the resin should be solid at normal temperature with a high degree of polymerization. Even such a thermosetting resin softens and fluidizes on heating and then cures. The thermosetting resin that is used in the present invention is one which is in the form of powder or granule and fluidizes on heating before the curing reaction takes place. The resin that is in the flowing state can be easily homogenized by stirring and mixing. The resin that merely softens on heating can be molded by compression molding but cannot be completely homogenized, with the interface between powder particles or granules remaining. The surface of the powder particles or granules of the resin is more deteriorated than that of the bulk of the resin because of oxidation by oxygen in air and adsorption of water and other substances. This deteriorated surface remains in the molded article if the resin is simply softened and molded by heating. In addition, minor ingredients added in the production of the resin are unevenly distributed in the resin, and they cannot be uniformly dispersed by simply molding the softened resin by heating under pressure. After carbonization, these foreign matters form the locally inhomogenous carbon structure that manifests itself as pits in the polished surface.

The resin that has become fluid on heating can be uniformly mixed with the deteriorated surface layer and the minor ingredients by stirring or mixing. The method and timing of such stirring or mixing are not specifically limited. For example, it would be possible to perform feeding and mixing (homogenizing) simultaneously by using a gear pump to feed the molten resin into the mold. It would also be possible to perform heating, melting, and mixing of the resin simultaneously by using a screw feeder. Better homogenization of the resin would be possible with a static mixer, metal sand layer, or porous plate which is installed in the connecting line between the gear pump or screw feeder and the mold. Needless to say, it is necessary to use a resin which is free of metallic foreign matter such as metal powder, metal carbide, metal oxide, metal silicate, and metal carbonate.

After introduction into a mold, the resin is cured by heating under pressure to give a molded article. The mold heating is intended to prevent the resin from cooling and solidifying and to perform thermosetting. The pressure is essential to uniformly and completely fill the resin into the mold and to uniformly disperse into the resin and discharge from the system the decomposition gas and condensation water resulting from curing.

The thus obtained molded article of resin is subsequently heat-treated or pyrolyzed in an inert atmosphere such as nitrogen and argon to give a molded article of uniform glass-like carbon which is substantially free of closed pores and structurally inhomogeneous minute regions. The molded article of glass-like carbon does not have pits that appear in the polished surface and periphery, and hence it has an extremely high degree of surface smoothness.

Examples C1 to C4 pertaining to claim 9 of the present invention are explained below with reference to Comparative Examples C1 and C2. Table C1 below shows the content (in ppm) of insoluble metal impurities, the content (in wt %) of water, and the ratio (in atomic %) of methylene carbon connected to hydroxyl group in the resins used in these examples.

TABLE C1

|  |  | Fe | Al | Ni | Co | Cr | Mg | Si | Ca | Water content | Methylene carbon |
|---|---|---|---|---|---|---|---|---|---|---|---|
| Example | C1 | 0.2 | 0.2 | 0.0 | 0.1 | 0.1 | 0.4 | 0.2 | 0.3 | 1.4 | 0.0 |
|  | C2 | 0.1 | 0.2 | 0.0 | 0.0 | 0.0 | 0.9 | 0.1 | 0.2 | 3.3 | 0.0 |
|  | C3 | 0.2 | 0.1 | 0.1 | 0.0 | 0.0 | 0.5 | 0.3 | 0.3 | 3.3 | 1.2 |
|  | C4 | 0.1 | 0.2 | 0.1 | 0.0 | 0.0 | 0.4 | 0.3 | 0.3 | 1.2 | 0.2 |
| Comparative | C1 | 0.2 | 0.2 | 0.1 | 0.1 | 0.1 | 0.5 | 0.3 | 0.3 | 3.3 | 0.0 |
| Example | C2 | 0.1 | 0.2 | 0.1 | 0.0 | 0.0 | 0.4 | 0.3 | 0.4 | 1.2 | 0.8 |

EXAMPLE C1

A granular bismaleimide-triazine resin having a flow starting temperature of 85° C. (measured with a flow tester) was heated at 115° C. in a nitrogen stream. After stirring, the molten resin was forced into a mold for molding at a mold temperature of 140° C., a mold pressure of 20 kgf/cm$^2$, and a molding, cycle of 20 minutes. After curing, the mold was cooled to 40° C., and a platelike molded article was demolded. The molded article was heated up to 1500° C. in an atmosphere of nitrogen for carbonization. Thus there was obtained a plate of glass-like carbon. Heating was accomplished stepwise at a rate of 100° C./h from room temperature to 140° C., at a rate of 5° C./h from 140° C. to 800° C., and at a rate of 20° C./h from 800° C. to 1500° C.

On polishing, the plate of glass-like carbon gave a uniform mirror surface. Observation under an interference microscope revealed that the polished surface is completely free of voids and has 2 pits per cm$^2$ on average. The pits were measured for depth and surface roughness using a non-contact optical surface roughness meter. The depth was less than 8 nm, and the surface roughness was 0.5 nm Ra. The polished surface was further examined by an SEM; no voids were found.

EXAMPLE C2

A powdery phenolic resin having a flow starting temperature of 105° C. (measured with a flow tester) was heated and fluidized in a screw feeder at 115° C. (at its forward end). After mixing, the molten resin was forced into a mold for molding at a mold temperature of 150° C. With the mold clamped at a pressure of 100 kgf/cm$^2$, the resin was cured for 3 minutes. Then, the molded article was demolded. The molded article was heated up to 1600° C. in an atmosphere of nitrogen for carbonization. Thus there was obtained a plate of glass-like carbon. Heating was accomplished stepwise at a rate of 100° C./h from room temperature to 150° C., at a rate of 5° C./h from 150° C. to 800° C. and at a rate of 20° C./h from 800° C. to 1600° C.

On polishing, the plate of glass-like carbon gave a uniform mirror surface. Observation under an interference microscope revealed that the polished surface is completely free of voids and has 3.5 pits per cm$^2$ on average. The pits were measured for depth and surface roughness using a non-contact optical surface roughness meter. The depth was less than 10 nm, and the surface roughness was 0.6 nm Ra.

The plate of glass-like carbon was fabricated into a substrate for magnetic disk, measuring 65 mm in outside diameter, 20 mm in inside diameter, and 0.635 mm thick. The substrate was given a Cr undercoating by vapor deposition and then coated with a magnetic layer (Co, Cr, Pt) and a carbon overlayer film. Thus there was obtained a magnetic disk. This magnetic disk was tested for write and read error. The error ratio was 2.2 per face (on average) for a linear recording density of 60 kFCI.

EXAMPLE C3

A powdery phenolic resin having a flow starting temperature of 100° C. (measured with a flow tester) was heated and fluidized. The molten resin was forced into a mold by a gear pump and cured at a mold temperature of 140° C. and a mold pressure of 50 kgf/cm$^2$ for 10 minutes. The mold was cooled to 40° C. and the molded article was demolded. The molded article was heated up to 1500° C. in an atmosphere of nitrogen for carbonization. Heating was accomplished stepwise at a rate of 120° C./h from room temperature to 140° C., at a rate of 5° C./h from 140° C. to 700° C., and at a rate of 20° C./h from 700° C. to 1500° C. Thus there was obtained a plate of glass-like carbon.

On polishing, the plate of glass-like carbon gave a uniform mirror surface. Observation under an interference microscope revealed that the polished surface is completely free of voids and has 2 pits per cm$^2$ on average. The pits were measured for depth and surface roughness using a non-contact optical surface roughness meter. The depth was less than 8 nm, and the surface roughness was 0.5 nm Ra. The polished surface was further examined by an SEM; no voids were found.

EXAMPLE C4

A powdery phenolic resin having a flow starting temperature of 105° C. (measured with a flow tester) was plasticized and melted using an injection molding machine for thermosetting resins at a screw speed of 30 rpm and a back pressure of 136 kgf/cm$^2$, with the cylinder temperature set at 100° C. at the front, 95° C. at the middle, and 80° C. at the rear. The molten resin was injected into a mold at 150° C. under an injection pressure of 1000 kgf/cm$^2$. After curing for 2 minutes, the molded article was demolded. The molded article was heated up to 1600° C. in an atmosphere of nitrogen for carbonization. Heating was accomplished stepwise at a rate of 100° C./h from room temperature to 150° C., at a rate of 5° C./h from 150° C. to 800° C. and at a rate of 20° C./h from 800° C. to 1600° C. Thus there was obtained a plate of glass-like carbon.

On polishing, the plate of glass-like carbon gave a uniform mirror surface. Observation under an interference microscope revealed that the polished surface is completely free of voids and has 1.8 pits per cm$^2$ on average. The pits were measured for depth and surface roughness using a non-contact optical surface roughness meter. The depth was less than 10 nm, and the surface roughness was 0.6 nm Ra.

The plate of glass-like carbon was fabricated into a substrate for magnetic disk, measuring 48 mm in outside diameter, 12 mm in inside diameter, and 0.635 mm thick. The substrate was given a Cr undercoating by vapor deposition and then coated with a magnetic layer (Co, Cr, Pt) and a carbon overlayer film. Thus there was obtained a magnetic disk. This magnetic disk was tested for write and read error. The error ratio was 1.1 per face (on average) for a linear recording density of 60 kFCI.

COMPARATIVE EXAMPLE C1

A powdery phenolic resin having a softening point of 120° C. was filled as such into a mold and was cured at a mold temperature of 135° C. and a mold pressure of 150 kgf/cm$^2$ for 10 minutes. The mold was cooled to 40° C. and the molded article was demolded. The molded article of resin was heated up to 1500° C. in an atmosphere of nitrogen for carbonization. Heating was accomplished stepwise in the same manner as in Example C3.

The plate of glass-like carbon thus obtained was polished. On examination with the naked eye, the polished surface looked like a completely uniform mirror surface. However, observation under an interference microscope revealed that the polished surface has about 100 pits per cm$^2$. The pits were as large as tens of micrometers. The pits were measured for depth using a non-contact optical surface roughness meter. The maximum depth was 70 nm. Examination of the polished surface by an SEM revealed the presence of large voids (several micrometers).

COMPARATIVE EXAMPLE C2

A powdery phenolic resin having a flow starting temperature of 120° C. (measured by a flow tester) was formed into tablets by pressing. After induction preheating, the tablets were placed in a mold and cured at a mold temperature of 130° C. and a mold pressure of 150 kgf/cm$^2$ for 5 minutes. After demolding, the molded article of resin was heated up to 1600° C. in an atmosphere of nitrogen for carbonization.

The plate of glass-like carbon thus obtained was polished. On examination with the naked eye, the polished surface looked like a completely uniform mirror surface. However, observation under an interference microscope revealed that the polished surface has about 50 pits per cm$^2$. The pits were as large as tens of micrometers. The pits were measured for depth using a non-contact optical surface roughness meter. The maximum depth was 40 nm.

The plate of glass-like carbon was fabricated into a substrate for magnetic disk, measuring 65 mm in outside diameter, 20 mm in inside diameter, and 0.635 mm thick. The substrate was given a Cr undercoating by vapor deposition and then coated with a magnetic layer (Co, Cr, Pt) and a carbon overlayer film. Thus there was obtained a magnetic disk. This magnetic disk was tested for write and read error. The error ratio was 4.5 and 35 per face (on average) for a linear recording density of 50 kFCI and 60 kFCI, respectively.

What is claimed is:

1. A carbon substrate which is made from a thermosetting resin having a content of Fe, Al, Ni, Co, Cr, and Mg insoluble in the resin which is not less than 1 ppm each or a content of Ca and Si insoluble in the resin which is not less than 2 ppm each, wherein said resin is treated to provide a content of Fe, Al, Ni, Co, Cr, and Mg insoluble in the resin of less than 1 ppm each and a content of Ca and Si insoluble in the resin of less than 2 ppm each, and wherein said treated resin is thereafter subjected to pyrolysis in an inert atmosphere and carbonization.

2. A carbon substrate as defined in claim 1, wherein the content of Fe and Al in the treated resin is less than 0.5 ppm each.

3. A process for producing a carbon substrate which comprises forming a treated resin into a molded article of desired shape and carbonizing the molded article, said treated resin containing less than 1 ppm each of insoluble Fe, Al, Ni, Co, Cr, and Mg and also containing less than 2 ppm each of insoluble Ca and Si, wherein said treated resin is obtained by treating a thermosetting resin having a content of Fe, Al, Ni, Co, Cr, and Mg insoluble in the resin which is not less than 1 ppm each or a content of Ca and Si insoluble in the resin which is not less than 2 ppm each.

4. A process for producing a carbon substrate as defined in claim 3, wherein the content of Fe and Al in the treated resin is less than 0.5 ppm each.

5. A process for producing a carbon substrate as defined in claim 3 or 4, wherein the treated resin is one which has been treated by dissolution in an organic solvent and subsequent filtration.

6. A process for producing a carbon substrate, which comprises forming a thermosetting resin into a molded article of desired shape and carbonizing the molded article, said thermosetting resin containing less than 1 ppm each of insoluble Fe, Al, Ni, Co, Cr, and Mg and also containing less than 2 ppm each of insoluble Ca and Si, wherein the thermosetting resin is one which is prepared by polymerization from a raw material solution which has been freed of insoluble impurities by filtration.

7. A process for producing a carbon substrate as defined in claim 3, wherein the thermosetting resin is one in which the water content is less than 3 wt % and the ratio of the methylene carbon connected to the hydroxyl group is less than 3% (based on the total carbon number).

8. A process for producing a carbon substrate as defined in claim 7, wherein the thermosetting resin is one in which the nitrogen content is more than 1 wt %.

9. A process for producing a carbon substrate as defined in claim 3 or 7, wherein the molded article is produced by the step of heating a powdery or granular thermosetting resin, thereby fluidizing it, and the step of introducing the fluidized thermosetting resin into a mold and curing it with heating under pressure.

10. A process for producing a carbon substrate as defined in claim 9, which further comprises the step of heat-treating the molded article of resin in an inert atmosphere, thereby converting it into a molded article of glass-like carbon.

\* \* \* \* \*

UNITED STATES PATENT AND TRADEMARK OFFICE
CERTIFICATE OF CORRECTION

PATENT NO. : 5,609,959
DATED : March 11, 1997
INVENTOR(S) : Maki HAMAGUCHI, et al.

It is certified that error appears in the above-indentified patent and that said Letters Patent is hereby corrected as shown below:

On the title page, Item [30], the Foreign Application Priority Data should read :

-- [30]

April 12, 1994    [JP] Japan..........6-73384

Feb. 24, 1994    [JP] Japan..........6-27009

Feb. 24, 1994    [JP] Japan..........6-27008 --

Signed and Sealed this

Tenth Day of June, 1997

*Attest:*

BRUCE LEHMAN

*Attesting Officer*    *Commissioner of Patents and Trademarks*